(12) United States Patent
Hojjatie et al.

(10) Patent No.: US 8,454,929 B2
(45) Date of Patent: Jun. 4, 2013

(54) CONTINUOUS PROCESS FOR PREPARATION OF CALCIUM THIOSULFATE LIQUID SOLUTION

(75) Inventors: Michael Massoud Hojjatie, Tucson, AZ (US); Constance Lynn Frank Lockhart, Tucson, AZ (US); Alexandros Dimitriadis, Phoenix, AZ (US); Jeroen Van Cauwenbergh, Phoenix, AZ (US); Roeland Van Dael, Tessenderlo (BE)

(73) Assignee: Tessenderlo Kerley, Inc., Phoenix, AZ (US)

( * ) Notice: Subject to any disclaimer, the term of this patent is extended or adjusted under 35 U.S.C. 154(b) by 15 days.

(21) Appl. No.: 13/211,135

(22) Filed: Aug. 16, 2011

(65) Prior Publication Data
US 2012/0031158 A1    Feb. 9, 2012

Related U.S. Application Data

(63) Continuation-in-part of application No. 12/764,843, filed on Apr. 21, 2010, now Pat. No. 8,034,318.

(51) Int. Cl.
 *B01J 8/00* (2006.01)
 *C01B 17/64* (2006.01)

(52) U.S. Cl.
 USPC ............ 423/514; 422/600; 422/630; 422/642

(58) Field of Classification Search
 USPC ........................... 423/514; 422/600, 630, 642
 See application file for complete search history.

(56) References Cited

U.S. PATENT DOCUMENTS

| 1,685,895 | A |  | 10/1928 | Wood |
| 2,041,397 | A | * | 5/1936 | Butterworth et al. ......... 210/699 |
| 2,198,642 | A |  | 4/1940 | Vonkennel et al. |
| 3,538,681 | A |  | 11/1970 | Cantrell et al. |
| 3,615,165 | A |  | 10/1971 | Clement |
| 3,630,672 | A |  | 12/1971 | Potis |
| 3,640,053 | A |  | 2/1972 | Gustavsson |
| 3,644,087 | A |  | 2/1972 | Urban |
| 3,671,185 | A |  | 6/1972 | LeFrancois et al. |
| 3,687,615 | A |  | 8/1972 | Gorin et al. |

(Continued)

FOREIGN PATENT DOCUMENTS

| EP | 0 436 890 | 7/1991 |
| EP | 1 526 113 | 4/2005 |

(Continued)

OTHER PUBLICATIONS

European Search Report for European Patent Application No. EP 06 735 550 dated Mar. 9, 2011.

(Continued)

*Primary Examiner* — Timothy Vanoy
(74) *Attorney, Agent, or Firm* — Fennemore Craig, P.C.

(57) ABSTRACT

An efficient process for the continuous preparation of calcium thiosulfate ($CaS_2O_3$) from lime sulfur, through oxidation is described. The process involves oxidizing calcium polysulfide intermediate in a series of reactors to produce calcium thiosulfate as a clear liquid in high concentration with minimal byproducts. The process results in the complete destruction of polythionates, permitting the calcium thiosulfate produced to be useful in certain leaching processes for precious metals. The invention further makes it possible to recycle the process water from the leaching process for use as a raw material reactant in the process for calcium thiosulfate production.

51 Claims, 8 Drawing Sheets

U.S. PATENT DOCUMENTS

| | | | |
|---|---|---|---|
| 4,070,182 A | 1/1978 | Genik-Sas-Berezowsky et al. | |
| 4,105,754 A | 8/1978 | Swaine, Jr. et al. | |
| 4,156,656 A | 5/1979 | Dannenberg et al. | |
| 4,269,662 A | 5/1981 | Theodore | |
| 4,369,061 A | 1/1983 | Kerley, Jr. | |
| 4,654,078 A | 3/1987 | Perez et al. | |
| 4,976,937 A | 12/1990 | Lee et al. | |
| 6,159,440 A | 12/2000 | Schoubye | |
| 6,344,068 B1 | 2/2002 | Fleming et al. | |
| 6,632,264 B2 | 10/2003 | Zhang et al. | |
| 6,984,368 B2 | 1/2006 | Hajjatie et al. | |
| 7,572,317 B2 | 8/2009 | Choi et al. | |
| 8,034,318 B1* | 10/2011 | Hojjatie et al. | 423/514 |
| 2004/0247518 A1* | 12/2004 | Hajjatie et al. | 423/514 |

FOREIGN PATENT DOCUMENTS

| | | |
|---|---|---|
| ES | 2 048 401 | 3/1994 |
| ES | 2 293 171 | 3/2008 |
| FR | 2 454 271 | 11/1980 |
| JP | SHO 48-6039 | 2/1973 |
| RU | 2 167 101 | 5/2001 |
| WO | 01/80646 | 11/2001 |

OTHER PUBLICATIONS

Saad et al., "Influence of thiosulfate on nitrification, denitrification, and production of nitric oxide and nitrous oxide in soil," Biol Fertil Soils, 21:152-159, Jan. 1996.

Spain Search Report for Spain Patent Application No. ES 2 377 388 dated Mar. 12, 2012.

Tartar, H. V., "The reaction between sulfur and calcium hydroxide in aqueous solution," Journal of the American Chemical Society, 36:495-498, Mar. 1914.

Patent Examination Report No. 1 from the Australian Patent Office for Application No. 2011226890 dated Sep. 21, 2012.

* cited by examiner

Thiosulfate (2, from trithionate impurity), Trithionate (3), Tetrathionate (4)

Thiosulfate (2, from trithionate impurity), Trithionate (3), Tetrathionate (4)

CONTINUOUS PROCESS FOR PREPARATION OF CALCIUM THIOSULFATE LIQUID SOLUTION

RELATED APPLICATION DATA

This application is a continuation in part of U.S. patent application Ser. No. 12/764,843 filed on Apr. 21, 2010, now issued into U.S. Pat. No. 8,034,318, the entirety of which is incorporated herein.

FIELD OF THE INVENTION

The present invention is directed to production of high purity calcium thiosulfate solution with high yield, and minimum solid byproducts and soluble contaminants such as polythionates, using continuous stirred tank reactors. The resulting calcium thiosulfate is particularly suitable in the leaching of precious metals. It is also a suitable plant nutrient.

BACKGROUND OF THE INVENTION

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complexing abilities.

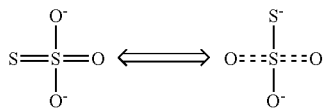

Thiosulfates are used in leather tanning, paper and textile manufacturing, flue-gas desulfurization, cement additives, dechlorination, ozone and hydrogen peroxide quenching, coating stabilizers, as an agricultural fertilizer, as a leaching agent in mining, and so on.

Due to these complex-forming abilities with metals, thiosulfate compounds have been used in commercial applications such as photography, waste treatment and water treatment applications.

Thiosulfates readily oxidize to dithionates, trithionates, tetrathionates, and finally to sulfates:

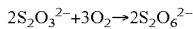
$$2S_2O_3^{2-}+3O_2 \rightarrow 2S_2O_6^{2-}$$

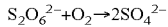
$$S_2O_6^{2-}+O_2 \rightarrow 2SO_4^{2-}$$

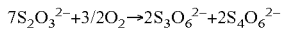
$$7S_2O_3^{2-}+3/2O_2 \rightarrow 2S_3O_6^{2-}+2S_4O_6^{2-}$$

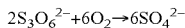
$$2S_3O_6^{2-}+6O_2 \rightarrow 6SO_4^{2-}$$

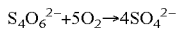
$$S_4O_6^{2-}+5O_2 \rightarrow 4SO_4^{2-}$$

Due to this transformation, thiosulfates are used as fertilizers in combination with cations such as ammonium, potassium, magnesium and calcium. The ammonium, alkali metal and alkaline earth thiosulfates are soluble in water. Water solubilities of thiosulfates decrease from ammonium to alkali metals to alkaline earth thiosulfates.

Calcium is an essential plant nutrient. Calcium availability is essential in the biochemistry of plants, and as it has been learned recently, in the nitrogen fertilizer efficiency of surface-applied urea. The need of soluble calcium by high-value crops is different than the role of important soil amendments such as lime or gypsum. Both soluble calcium and these soil amendments are extremely important in soil fertility and plant nutrition and complement each other.

In the mining industry, thiosulfate leaching of gold is preferred over the conventional cyanide leaching due to the hazardous nature of cyanide. Calcium thiosulfate is an alternative replacement for lime/cyanide slurry in leaching of gold.

"Lime-sulfur" is a commonly used term for a calcium thiosulfate and calcium polysulfide mixture resulting from reaction of lime and sulfur. U.S. Pat. No. 1,685,895 describes the formation of a lime-sulfur solution from lump lime, lump sulfur, and hot water.

J. W. Swaine, Jr. et al. in U.S. Pat. No. 4,105,754 describe the production of calcium thiosulfate by a metathesis reaction of ammonium thiosulfate and calcium hydroxide or calcium oxide. This approach requires constant removal of ammonia by air stripping at below the boiling point of the mixture and capturing the gas.

Japanese Patent No. 6,039 issued in 1973 describes preparation of calcium and magnesium thiosulfate by treating sulfur and the corresponding sulfite in an alkaline solution. High yields are only obtained with magnesium thiosulfate. This patent also describes the formation of calcium thiosulfate from a salt exchange process between magnesium thiosulfate and calcium hydroxide.

Sodium thiosulfate and calcium chloride were used to produce calcium thiosulfate in Spanish Patent No. 245,171. The byproduct of this approach is a large amount of sodium chloride in the calcium thiosulfate product.

Lee, et al. in U.S. Pat. No. 4,976,937 describe the formation of a mixture of calcium polysulfide/calcium thiosulfate from a lime-sulfur mixture at 6-100° C. to be used for removal of sulfur dioxide from flue gases.

Vonkennel and Kimmig in U.S. Pat. No. 2,198,642 describe the production of stable calcium thiosulfate solution from calcium chloride and sodium thiosulfate.

Russian Patent No. RU 2167101 C2 describes the preparation of sodium thiosulfate and calcium thiosulfate from sulfur and a solution of sodium alkali or calcium alkali in stoichiometric amounts under autoclave conditions with an oxidizer.

Hojjatie, et al. in U.S. Pat. No. 6,984,368 B2 describe the preparation of calcium thiosulfate liquid fertilizer solution from lime, sulfur and oxygen. The patent describes the preparation of calcium thiosulfate in batchwise preparation.

The thiosulfate leaching of gold has been proven technically viable. For example, see U.S. Pat. No. 4,070,182, U.S. Pat. No. 4,269,662, and U.S. Pat. No. 4,369,061, which describe the use of ammonium thiosulfate in gold leaching. Application of copper-ammonium thiosulfate in the gold leaching process is described in U.S. Pat. No. 4,654,078. Choi, et al. in U.S. Pat. No. 7,572,317 describe the use of ammonium, sodium, and calcium thiosulfate in the leaching of gold.

BRIEF SUMMARY OF THE INVENTION

The present invention is a continuous process for the preparation of calcium thiosulfate and is an improvement over prior art processes. The invention forms minimal byproducts, improves the process equipment for faster absorption of oxygen, and subsequently shortens the reaction time, while producing the calcium thiosulfate product in a continuous manner by employing a setup of multiple continuous stirred tank reactors (CSTRs).

The present invention further relates to a continuous process for the preparation of calcium thiosulfate by the oxidation of calcium polysulfide (lime-sulfur) at particular pressures, using certain mole ratios of lime and sulfur, and under certain oxidation temperatures and durations, to produce a liquid solution of calcium thiosulfate in high concentration in a suspension having minimal solid byproducts and no or minimal undesirable polythionates. The solid byproducts produced in the process of the invention are less than about 2% by weight of the liquid solution, and consist of insoluble calcium salts such as sulfite, sulfate and carbonate, unreacted sulfur and a small amount of the retained calcium thiosulfate product.

The aforesaid solution of calcium thiosulfate and byproducts may then be treated with an acid to achieve a certain pH, to avoid decomposition of the product. The suspension may then be treated with an appropriate flocculant to separate the suspension from the desired liquid and to provide an ease of filtration.

It is accordingly an objective of the present invention to provide a method for production of high purity calcium thiosulfate by an oxidation reaction of lime-sulfur, wherein inexpensive raw materials, such as calcium oxide or calcium hydroxide, sulfur, water, and oxygen are used.

It is still another objective of the present invention to produce calcium thiosulfate by oxidation of lime-sulfur wherein difficult and potentially expensive processing and separation steps are avoided.

It is another objective of the present invention to produce high purity calcium thiosulfate in high concentration of about 22-29%, without any further need for concentration.

It is still another objective of this invention to produce calcium thiosulfate with minimum residual contamination from byproducts.

It is still another objective of the present invention to minimize the solid byproducts to their minimum level up to about 2% by weight of the calcium thiosulfate solution.

It is still another objective of the present invention to produce calcium thiosulfate with very low (ppm level) of polythionates, which are soluble oxidation byproducts. The calcium thiosulfate product produced by this method is suitable for certain precious metal leaching applications.

It is still another objective of the present invention to produce calcium thiosulfate in a continuous process using a series of continuous stirred tank reactors (CSTRs).

It is still another objective of the present invention to provide a method for facile separation of calcium thiosulfate product from solid byproducts originated from calcium oxide or calcium hydroxide.

It is still another objective of the present invention to provide a method for producing stable calcium thiosulfate product at close to neutral pH.

It is still another objective of the present invention to eliminate any potential bacterial growth in the final product by addition of an appropriate chemical such as alkali metal metabisulfite salts.

BRIEF DESCRIPTION OF THE DRAWINGS

The present invention will now be described in more detail, with reference to preferred embodiments, given by way of examples, and illustrated in the accompanying drawings in which.

DETAILED DESCRIPTION OF THE INVENTION

Figure 1:
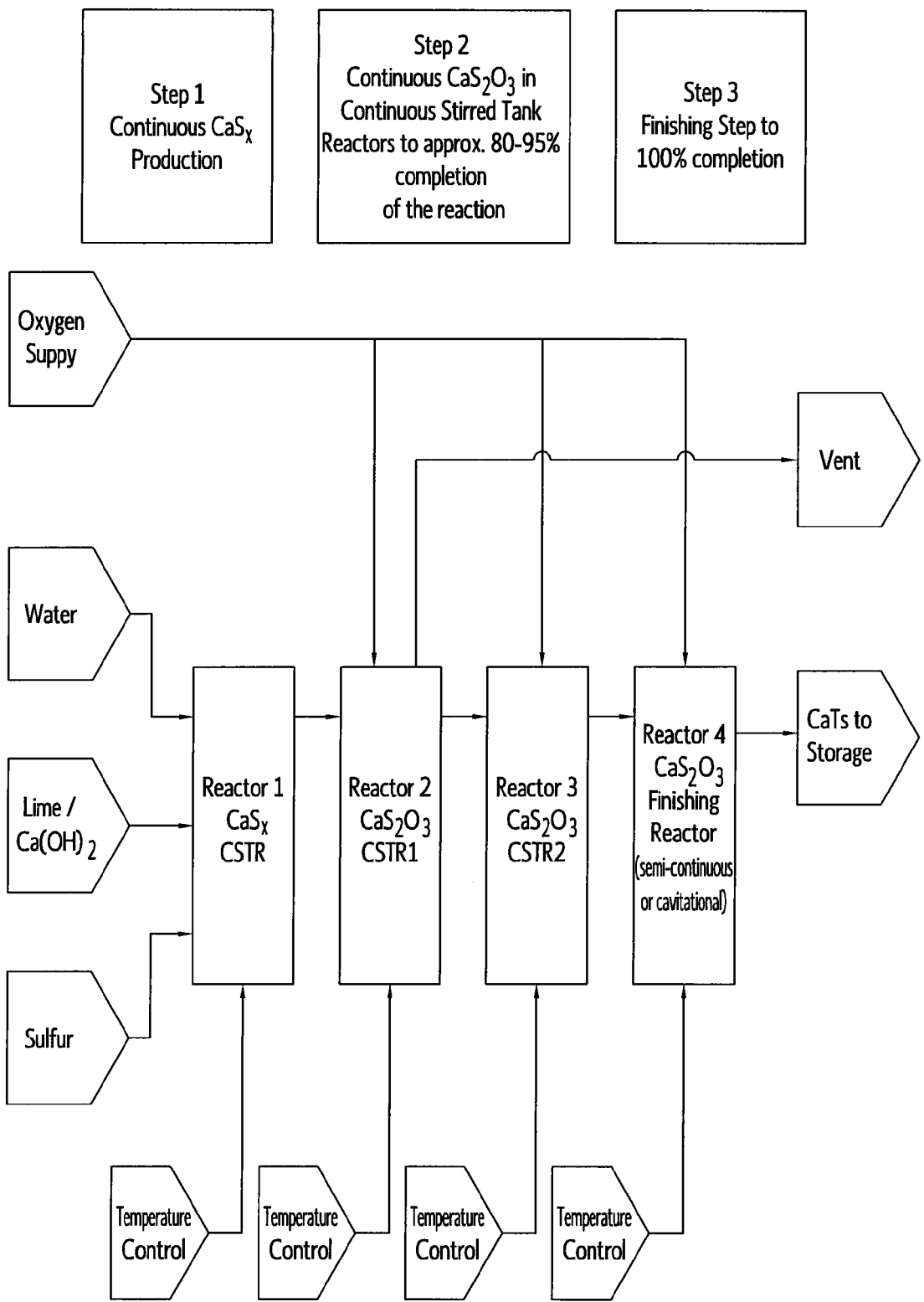
FIG. 1 is a process flow diagram, including a schematic illustration of a process for the continuous production of calcium thiosulfate in accordance with a preferred embodiment of the present invention.

The invention involves a continuous process for the production of calcium thiosulfate ($CaS_2O_3$) from calcium polysulfide ($CaS_x$) that allows high production volumes with minimal peak consumption of cooling water, lower product transfer flows and less foaming issues in case of high pressure operation. The present invention is a significant and unexpected improvement over the prior art's batch processes for producing calcium thiosulfate.

The process involves employing a series of continuous stirred tank reactors (CSTRs) under such conditions that high purity calcium thiosulfate with minimum dissolved byproducts, and little to no polythionates, is produced continuously. This calcium thiosulfate product is suitable for leaching of precious metals because of its minimal polythionate content, as well as other uses.

The term CSTR as used herein is intended to encompass any container or tank within which calcium polysulfide may be oxidized to calcium thiosulfate. Preferred CSTRs are high efficiency mixers. Examples of CSTRs include but are not limited to the following: tanks equipped with impellers or other stirring-type agitators, and inline high shear and high impacting mixing equipment such as bubble columns, packed columns, tray columns, spray columns, jet loops, pipes/tubes and tanks with cavitational technology.

In a preferred embodiment of the invention, the CSTRs used for the oxidation reaction are tanks equipped with impellers or blades for agitating the reactant materials within the tank. In a still more preferred embodiment, the tanks are equipped with impellers having three agitation blades arranged vertically on the impeller. While tanks with a single impeller having three agitation blades is preferred, the invention also encompasses tanks that have more than one impeller, as well as impellers which have less than or more than three agitation blades each.

If oxygen is used as the oxidizing agent, as it is in a preferred embodiment of the invention, then the CSTR must be capable of being pressurized and depressurized.

Preferably, the CSTRs are equipped with heating and cooling means, such as heating and/or cooling jackets. The CSTRs used in the present invention are further supplied with means for transferring materials, such as pipes and/or tubing and pumps, to facilitate the transfer of materials (such as reagents, starting materials, gases, liquids, reaction products, etc.) into and out of the CSTR, including from one CSTR to a subsequent CSTR in line.

Preferably the CSTRs used in this invention are equipped with devices for monitoring temperature, pH and pressure, as well as other conditions such as measuring oxidation reduction potential device (ORP), and also for sampling contents of the CSTRs. Monitoring pressure and other conditions, and sampling contents, is desirable in order to determine the progress of the oxidation of the calcium polysulfide to calcium thiosulfate. The process of the invention provides a way to oxidize all of the calcium polysulfide to calcium thiosulfate, while avoiding overheating the calcium thiosulfate which would cause it to decompose. Once all or substantially all of the $CaS_x$ in the reactor has been oxidized to calcium thiosulfate, the solution is then transferred to storage or to other equipment for further processing, as discussed herein.

The following are methods for evaluating samples to determine the progress of the oxidation.

Oxidation Reduction Potential (ORP) monitoring. The $CaS_x$ has a certain ORP value, and as it is oxidized to calcium thiosulfate, the ORP changes. Once the ORP value ceases changing, oxidation is complete.

Pressure monitoring. During the process, the pressure in the reactor will decrease as the $CaS_x$ is oxidized. Once all of the $CaS_x$ has been oxidized, the pressure in the reactor will drop and remain stable, i.e., it will cease decreasing.

Color change monitoring. Calcium thiosulfate is a colorless, clear solution. If all of the $CaS_x$ has not been oxidized, the solution will be colored. For example, $CaS_x$ has a red color, but as it is oxidized to calcium thiosulfate, the solution turns from red to orange to yellow, becoming lighter in color as the production of calcium thiosulfate increases.

Lead acetate paper. The presence of $H_2S$ indicates that the oxidation reaction is not complete (i.e., all of the $CaS_x$ has not been oxidized to calcium thiosulfate), because it means that all of the sulfide has not yet been converted to thiosulfate. Therefore, a quick and easy way to monitor the progress and completion of the oxidation reaction and conversion of polysulfide to thiosulfate is the presence or absence of color change on lead acetate paper exposed to the sample. If polysulfide exists, the lead acetate paper turns black.

Other methods and monitoring devices for checking for the presence of $H_2S$ may be employed in addition to or in place of lead acetate paper.

The invention further involves the use of specific process conditions, including operating pressures, operating temperatures, agitation rates for mixing of the reactants and raw material feed mole ratios. Using these specified conditions, the process of the present invention provides a superior product to that of prior art batch processes, resulting in a high purity, high concentration calcium thiosulfate product with minimum insoluble byproducts and low soluble oxidation byproducts, such as polythionates. The resulting product does not need to be further concentrated by evaporation or other means, resulting in significant savings in time for preparing a saleable product, as well as monetary savings due to less treatment materials and processes needed to concentrate and/or filter the product before it is in a useable and saleable state.

The process involves the oxidation of a slurry of lime-sulfur (also referred to herein in as calcium polysulfide or $CaS_x$) with oxygen under pressure, preferably pure oxygen. In an alternative embodiment, sulfur dioxide may be used to oxidize the lime-sulfur slurry, with appropriate alterations to the process. For example, oxidation using sulfur dioxide may be accomplished at atmospheric pressure.

The raw materials employed in this invention are inexpensive calcium oxide, sulfur, and oxygen, which are all used in the formation of the desired product. No secondary byproduct is formed. The residual solids are formed from the impurities in commercial calcium oxide starting material. In the process according to the invention, the residual solids in the calcium thiosulfate are minimal, and are typically in the amount of less than 2% by weight of the amount of the calcium thiosulfate in the solution.

The process described herein also avoids the undesirable oxidation of calcium thiosulfate product to calcium sulfate. In general, filtration of colloidal suspensions of mixtures of calcium sulfate, calcium sulfite, calcium carbonate and sulfur are slow and difficult. Under the conditions described herein in accordance with the present invention, very little of these byproducts are formed and what byproducts are formed are quickly and easily separated by adjusting the pH and by use of a certain flocculant.

FIG. 1 illustrates a schematic for an exemplary, non-limiting embodiment of the process of the invention.

There are two main steps in the calcium thiosulfate production process according to the invention: production of calcium polysulfide ($CaS_x$) and oxidation of $CaS_x$ to calcium thiosulfate ($CaS_2O_3$).

The process of this invention comprises three general sections: a lime slaking section, a reaction section and a filtration section.

In the slaking section, a weighed amount of dry lime and measured amount of water are mixed to produce lime slurry. The dry lime consists of primarily calcium oxide, also known as Quicklime, and reacts with water to produce calcium hydroxide, also known as hydrated lime. The reaction is exothermic:

$$CaO + H_2O \rightarrow Ca(OH)_2$$

The lime slurry is then transferred to the Reactor 1 shown in FIG. 1 for lime-sulfur formation, and oxidation in subsequent Reactors 2, 3 and 4, according to the following steps:

Production of calcium sulfide and thiosulfate $$3Ca(OH)_2 + 4S \rightarrow 2CaS + CaS_2O_3 + 3H_2O$$

The sulfide dissolves additional sulfur to form polysulfide ($CaS_x$)

$$2CaS + CaS_2O_3 + (2x-2)S \rightarrow 2CaS_x + CaS_2O_3$$

Overall $CaS_x$ reaction $$3Ca(OH)_2 + (2x+2)S \rightarrow 2CaS_x + CaS_2O_3 + 3H_2O$$

Oxidation reaction of $CaS_x$ to calcium thiosulfate $$2CaS_x + 3O_2 (x=2) \rightarrow 2CaS_2O_3$$

Overall calcium thiosulfate reaction $$3Ca(OH)_2 + 6S + 3O_2 \rightarrow 3CaS_2O_3 + 3H_2O$$

The reaction section of the process is performed via CSTR operation, resulting in high purity and high concentration calcium thiosulfate at about pH 11. Acidification of the product with an appropriate acid lowers the pH to a more desirable 7.5-8.5. The resulting calcium thiosulfate product has a concentration of about 22-29% and is stable for months.

Description of the Continuous Calcium Thiosulfate Process

Step 1: Continuous Production of Calcium Polysulfide ($CaS_x$)

In this continuous process, raw materials (lime slurry, sulfur and dilution water) are fed into the $CaS_x$ (calcium polysulfide) reactor based on the required production load and the raw material consumption ratios as defined by the chemical reactions. (See FIG. 1, CSTR—Reactor 1.) The feed of raw materials is balanced by the output of $CaS_x$ solution by level or flow control. This step is preferably performed in a CSTR.

The term "dilution water" is any water suitable for diluting the lime slurry and sulfur added in this first stage. For example, "tap" water, well water, deionized (distilled) water, or even water recycled from the gold leaching process, having increased levels of polythionates, can be used as dilution water. The kinetics of the $CaS_x$ reaction are such that the reaction will be almost fully completed during the residence time in the reactor. Any non-reacted raw materials will react downstream in the $CaS_x$ storage tanks or in the calcium thiosulfate reactor.

Referring to FIG. 1, sulfur is added to the lime slurry in Reactor 1. The mixture is agitated, and an exothermic reaction between sulfur and lime takes place to produce lime-sulfur ($CaS_x$) slurry. The following reaction takes place in the $CaS_x$ reactor (Reactor 1):

Production of Calcium Polysulfide

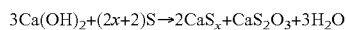

$$3Ca(OH)_2 + (2x+2)S \rightarrow 2CaS_x + CaS_2O_3 + 3H_2O$$

Although the reaction is exothermic, heat must be supplied to the reactor to heat up the raw materials and keep the reaction at the required operating temperature of about 90-98° C. or about 195-208° F. It is preferable to conduct this reaction as quickly as possible, because some calcium thiosulfate will form in this step, and the calcium thiosulfate decomposes to calcium sulfite ($CaSO_3$) at about 100° C. The shorter the time of this reaction, the less time the calcium thiosulfate is exposed to decomposition temperatures. The calcium thiosulfate that decomposes to calcium sulfite ($CaSO_3$) cannot be recycled in the process and will undesirably increase the solid byproduct.

The optimal lime-sulfur solution will contain enough calcium to correspond to about 25-29.5% calcium thiosulfate—this is about 6.6-7.8% $Ca^{++}$. As indicated in the reaction formula above, the lime-sulfur solution will contain some calcium thiosulfate. However, calcium thiosulfate will decompose at temperatures near boiling (100° C.), forming undesirable solid (insoluble) byproducts. Therefore, while it may be desirable to have an increased concentration of calcium thiosulfate in the lime-sulfur solution, this must be weighed against the risk of the calcium thiosulfate that is present during the $CaS_x$ production reaction decomposing to form undesirable solid byproducts. Operators of the process according to the invention will make a trade-off between the level of calcium thiosulfate in the lime-sulfur and potential for byproducts.

The "x" number for the polysulfide portion of the lime-sulfur (i.e., the "x" in $CaS_x$) should be as near to 2 as possible, because the equation for the oxidation of calcium polysulfide is: $CaS_x + O_2 \rightarrow CaS_2O_3 + (x-2)S$. Theoretically, if $x=2$, the residual sulfur (which forms undesirable byproducts) will be non-existent. However, the higher the thiosulfate concentration in the lime-sulfur solution, the higher the x number for the remaining polysulfides. Finally, the lower the x number in the remaining polysulfides, the lower is the solubility of the solution. Each contributory factor here must be analyzed to determine which are the priorities, for example, increased thiosulfate concentration, and/or the solubility of products of reaction of lime-sulfur. The underlying concern is the stability of calcium thiosulfate at temperatures near boiling.

The lime-sulfur synthesis portion of the process of the invention should be conducted in the shortest time possible, in order to enhance the rate of production, and to decrease decomposition of the product which will occur at elevated temperatures over time. In order to determine the point at which lime-sulfur synthesis should cease and oxidation should begin (and the materials in Reactor 1 shown in FIG. 1 should be transferred to Reactor 2), one must determine the point at which $Ca^{++}$ concentration is maximized. The final lime-sulfur intermediate is a slurry. A sample of the lime-sulfur slurry is then filtered, and the sample is then subjected to a titration with EDTA to easily and quickly monitor $Ca^{++}$ concentration. When the $Ca^{++}$ concentration stabilizes, the lime-sulfur slurry should be transferred to the next reactor for oxidation of the $CaS_x$.

Optimum temperature was about 90-92° C. Calcium thiosulfate, in pure solution, was determined to decompose at 97° C. Elevated $H_2S$ evolution is also noted at temperatures above about 92-94° C. Also, a problematic foaming occurs during lime-sulfur syntheses conducted near the boiling point, but this is not as apparent at slightly lower temperatures. Slaking of CaO alone increases temperature of the initial raw materials to 50-60° C. Each reacting slurry was sampled periodically to follow the progress of $Ca^{++}$ concentration. The $Ca^{++}$ concentration as $CaS_x$ stabilizes from 135 to 190 minutes at about 90-92° C.

If either lime (CaO) or hydrated lime [$Ca(OH)_2$] is used as the calcium source, a slurry of the lime or hydrated lime in water is first provided and then sulfur is added to the slurry. Either a pre-existing slurry of hydrated lime is used, or a slurry is formed by slaking, which is mixing lime with water to form hydrated lime. In a preferred embodiment, the lime is about 96% to about 99% pure. Lower purity lime may be used, but at the expense of higher byproduct solids at the completion of the reaction, as well as slower reaction kinetics. Also these byproducts and inerts have been found to consume reactor volume and decrease the overall production capacity.

Preferably, the mixture of sulfur and the lime slurry is heated. In a preferred embodiment, it is heated to at least about 70° C. (about 158° F.). More preferably, it is heated to a temperature in the range of about 85 to about 99° C. (about 185-210° F.). Even more preferably, it is heated to a temperature in the range of about 90 to about 92° C. (about 195-198° F.).

The sulfur is preferably combined with the calcium hydroxide at a sulfur to calcium hydroxide mole ratio of about 1:1 to about 6:1. More preferably, the mole ratio is about 3.4:1 to about 6:1. Still more preferably, the mole ratio is about 3.4:1 to about 3.8:1. Even more preferably, the ratio is about 3.6:1.

In a preferred embodiment, the mole ratio of sulfur to calcium hydroxide to water is at least about 2:6:30.

In another preferred embodiment, the mole ratio of sulfur to calcium hydroxide to water is about 3.6 to about 4.9:1:25.5.

If the sulfur to calcium hydroxide to water ratio used is about 3.6:1:25.5, then the reaction takes about 2-6 hours to complete.

In an exemplary embodiment, the calcium polysulfide solution was produced at a mole ratio of about 3.6 to 4 moles of sulfur per mole of calcium hydroxide, and then the amount of calcium hydroxide required to obtain the stoichiometric 2:1 ratio is added prior to or during the oxidation step.

Step 2: Continuous Production of Calcium Thiosulfate ($CaS_2O_3$) in CSTRs

According to a preferred embodiment of the invention depicted in FIG. 1, the oxidation of $CaS_x$ to calcium thiosulfate is done in two CSTRs in series (Reactor 2 and Reactor 3). The calcium polysulfide solution is transferred from Reactor 1 to Reactor 2. Alternative embodiments of the invention may utilize more than two CSTRs in series to perform this step. The reaction that takes place in both CSTRs is the following oxidation reaction:

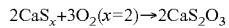

$$2CaS_x + 3O_2(x=2) \rightarrow 2CaS_2O_3$$

The CSTRs (Reactors 2 and 3 shown in FIG. 1) are used to agitate the mixtures therein, to facilitate oxidation of the $CaS_x$ (and $CaS_x$ and calcium thiosulfate) solutions by maximizing contact between oxygen introduced into, and liquid in, the reactor. In a preferred embodiment, either or both of Reactors 2 and 3 agitate the mixtures therein at a rate of about 100-1200 rpm at about 70° C. In another embodiment, agitation occurs at a rate of about 600-1000 rpm at about 70° C. In yet another embodiment, agitation occurs at a rate of about 600-900 rpm at about 70° C. In still another embodiment, agitation occurs at a rate of about 600-800 rpm at about 70° C.

In an alternative embodiment of the invention, either or both of Reactors 2 and 3 agitate the mixtures therein at a rate of about 900-1500 rpm at about 90° C. In another embodiment, agitation occurs at a rate of about 1200-1500 rpm at about 90° C. In yet another embodiment, agitation occurs at a rate of about 1500 rpm at about 90° C.

The first of the two CSTRs in series (Reactor 2) oxidizes approximately 60-90% of the $CaS_x$ in solution that was produced in Reactor 1. In a preferred embodiment, Reactor 2 is pressurized with oxygen and mixed with a high efficiency mixer to maximize the contact between the oxygen gas and the calcium thiosulfate solution.

In each of Reactors 2 and 3, oxidation of calcium polysulfide to calcium thiosulfate is accomplished under pressure. These reactors are preferably purged so that any air therein is replaced with oxygen gas, and the pressure within the reactors is increased. The reactors are pressurized to about 15-80 psig, more preferably to about 40-80 psig, and the contents are heated to about 70-95° C., more preferably to about 70-75° C.

The partially oxidized calcium thiosulfate solution produced in Reactor 2 is pumped continuously from Reactor 2 to the second CSTR in series (Reactor 3), where it is oxidized to approximately 70-95% of the full oxidation during its residence time in this reactor. A continuous flow of almost fully oxidized calcium thiosulfate is discharged to storage (not shown in FIG. 1) or to the next stage of the process. As the reaction is exothermic, all CSTR oxidation reactors (Reactors 2 and 3) have to be maintained at the desired oxidation temperature (about 60-80° C.). In a preferred embodiment, oxidation occurs in a reactor maintained at about 70° C. Operating temperature can be increased to speed up the chemical reaction and minimize the reaction time, but should not be increased beyond about 98° C., or more preferably beyond about 94° C., to avoid causing the calcium thiosulfate to degrade, causing the undesirable formation of polythionates.

The inventors determined that the use of higher purity lime resulted in a reduced amount of byproduct solids. Preferably, the lime is about 96% to about 99% pure. The amount of byproduct solids was decreased to less than 2 wt % of the total product by utilizing higher purity lime. The reaction time was also decreased using higher purity lime.

Examples of lime with different purity levels is as follows: Source 1: >99 wt % $Ca(OH)_2$; Source 2: 97.40 wt % $Ca(OH)_2$; Source 3: 94.20 wt % $Ca(OH)_2$; and Source 4: 95.80 wt % $Ca(OH)_2$. Higher purity lime reacts more quickly and has less solid byproducts formed during the reaction.

The oxygen used for the purpose of oxidizing can be supplied by atmospheric air or by an enriched oxygen supply source. While atmospheric air is an option, an enriched oxygen supply is preferred, because the higher the oxygen concentration, the faster the reaction will occur. The oxygen is delivered to the oxidation reactor at the desired pressure and volume required to support the oxidation reaction. The primary factors that determine the rate of oxidation and the time to complete the oxidation reaction are oxygen concentration, lime-sulfur slurry contact area with the oxygen, and reaction temperature. The objective is to complete the reaction in a reasonable amount of time consistent with production requirements and to avoid prolonged reaction times that can lead to increased amounts of decomposition products and oxidation to form calcium sulfate.

Oxygen supplied by air at atmospheric pressure is low in concentration, resulting in longer reaction times which are not preferred for industrial production. The availability of oxygen for the reaction can be increased by compressing the air to higher pressures, which maximizes contact between the oxygen and the $CaS_x/CaS_2O_3$ solution. Increasing the air pressure to five atmospheres or about 60 psig increases the available oxygen for the reaction to about the same level as utilizing pure oxygen at atmospheric conditions. When air is used, the inert gases must be vented or purged periodically. Alternatively, pure oxygen is preferably used, in part because it can be used at lower pressures and with minimized requirement for purging of the inert gases.

In the CSTR reactors, preferred pressures are in the range of 15-80 psig, and more preferably 60-80 psig. Even more preferably, the pressure is 80 psig.

An alternative to using oxygen or air as the oxidizer is to use sulfur dioxide, which may be used without pressurizing the CSTR oxidation reactors, i.e., may be used at atmospheric pressure.

In a preferred embodiment, the CSTRs are each equipped with one impeller, each impeller having three agitation blades disposed vertically relative to one another. The uppermost agitation blade (first blade) is just below or at adjacent surface of the liquid $CaS_x/CaS_2O_3$ solution in the CSTR, and the lowest agitation blade (the second blade) is located adjacent to the bottom of the CSTR. The oxidizing agent, preferably oxygen, is preferably introduced into the $CaS_x/CaS_2O_3$ solution in the CSTR at a point adjacent the middle agitation blade (the third blade), at a point between the uppermost and lowest agitation blades, also referred to herein as the feed injection point.

The CSTR reactors are preferably supplied with one or more mechanisms to permit a continuous purge of vapor phase to prevent build-up of inerts in the vapor space and to reduce foaming.

Step 3. Finishing Step to 100% Oxidation

Because some fraction of the product will always be lacking residence time in the system for full oxidation, a finishing step will be required if the $CaS_x$/calcium thiosulfate solution produced in the oxidation reactors (e.g., Reactors 2 and 3 shown in FIG. 1) is to be fully oxidized, as is preferred. Illustrated in FIG. 1 is a representation of a finishing reactor (Reactor 4). Reactor 4 may consist of a single reactor, such as a cavitational reactor, or may consist of a series of reactors, as discussed below. Two possible solutions to fully oxidize the solution are proposed:

1. A cavitational reactor that is operating at oxygen pressures up to about 3000 psig has been proven to complete the oxidation at a significantly reduced time. At low oxygen pressures, the cavitational reactor can be used to finish the final about 1% to 5% of the oxidation. At oxygen pressures up to about 3000 psig, the cavitational reactor can oxidize about 50-100% of the $CaS_x$ to calcium thiosulfate at faster rates than a conventional CSTR.
2. A series of semi-continuous reactors that finish the $CaS_x$/calcium thiosulfate solution in an automated batch-sequence, providing an additional oxidation step in a batch type reactor. The oxidation can be controlled using a fixed oxidation time or using online measurements to indicate full oxidation of the product, such as calibrated ORP measurements.

Oxidation of the calcium polysulfide ($CaS_x$) intermediate by oxygen to the calcium thiosulfate product was conducted using oxidation reduction potential (ORP) to determine the progress of the oxidation process. This was done to ensure the maximum conversion for the highest yield, avoid over-oxidation, and to avoid formation of soluble byproducts such as polythionates and insoluble byproducts such as sulfate. The stoichiometric reactions followed were:

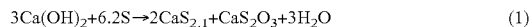
$$3Ca(OH)_2 + 6.2S \rightarrow 2CaS_{2.1} + CaS_2O_3 + 3H_2O \quad (1)$$

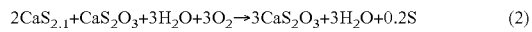
$$2CaS_{2.1} + CaS_2O_3 + 3H_2O + 3O_2 \rightarrow 3CaS_2O_3 + 3H_2O + 0.2S \quad (2)$$

Figure 2:
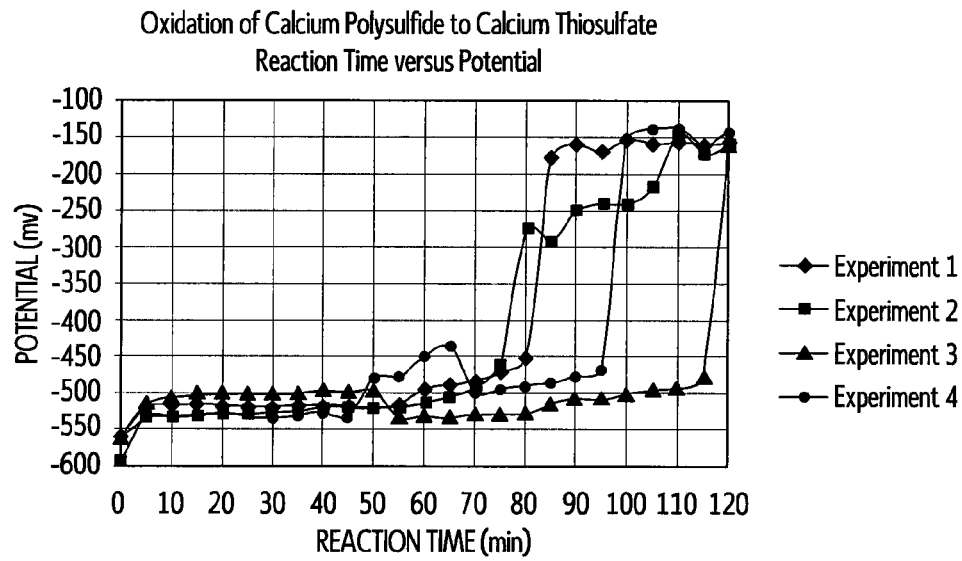
FIG. 2 is a graphical representation of the oxidation reduction potential for the oxidation of calcium polysulfide ($CaS_x$) to calcium thiosulfate ($CaS_2O_3$).

Oxidation Reduction Potential (ORP) values were measured using an ORP electrode. Verification of the electrode function was confirmed using ORP standard. The ORP values were measured under similar reaction conditions (T, P and agitation rate) for four sets of reactions. The results are shown in FIG. 2.

The data indicate that, as the $CaS_x$ oxidation progresses, the redox potential increases. In all four reactions, there is a point where the change in potential is significant and $\Delta x/\Delta y$ approaches zero. An equivalence point is noted in all reactions. The ORP measurement during the oxidation of $CaS_x$ to calcium thiosulfate accurately determined the completion of the oxidation process. An abrupt increase in the ORP of $CaS_x$ slurry is noted when oxidation is complete.

Calcium Thiosulfate Oxidation: Reaction Kinetics for a Batch Process

The inventors determined that the total batch or reaction time (to 100% completion) to oxidize to calcium thiosulfate depends on different parameters, such as agitation, reaction temperature, reaction pressure, etc. The impact of these parameters will be explained further in this document. However, independent of these parameters, the oxidation rate can be expressed as a function of the relative reaction time (as a fraction 0-100% of the total batch time).

Figure 3:
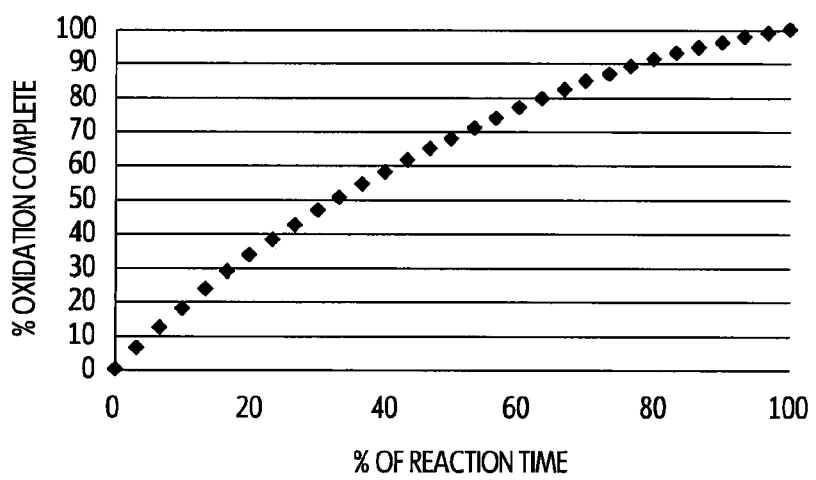
FIG. 3 is a graphical representation of the batch oxidation of $CaS_x$ to $CaS_2O_3$ as a function of reaction time.

FIG. 3 shows a non-linear relationship, with a high oxidation rate at the beginning, slowing down towards the end of the batch. This explains the higher oxygen consumption and higher cooling requirements (heat of reaction) at the beginning of the batch, compared to the end of the batch.

Calcium Thiosulfate Oxidation: in a CSTR

An important consideration in maintaining good oxidation rate is to provide efficient gas/liquid contacting, which provides adequate contact area and contact time for the oxygen carrying gas and the liquid lime-sulfur slurry to react. Contacting is important because the reaction primarily takes place at the oxygen gas-liquid slurry interface. If this interface area is not adequate, the reaction will be slow, leading to a larger amount of undesirable byproducts.

To provide sufficient residence time for the oxidation reaction, a series of CSTRs is used in the present invention. Utilizing a series of CSTRs keeps the product longer in the system compared to one reactor.

Figure 4:
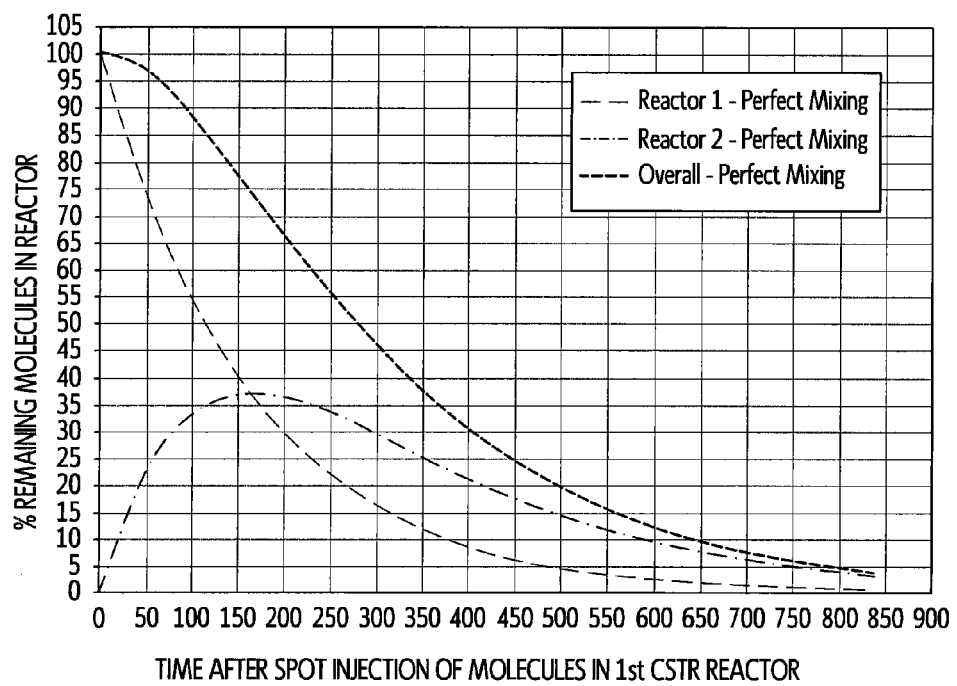
FIG. 4 is a graphical representation of the residence time of $CaS_2O_3$ in a system using two CSTRs in series.

FIG. 4 graphically illustrates the results of a simulation of two CSTRs in series. The graph shows the fraction of product remaining in the system, after it was charged in the first reactor (which corresponds to Reactor 2 in FIG. 1) at time 0 and assuming perfect mixing. It shows that immediately some of the product is lost out of the first reactor (Reactor 2). Reactor 2 loses the product exponentially. As a consequence, the second reactor (which corresponds to Reactor 3 in FIG. 1) is fed slowly with the product charged via spot injection at time 0. At the same time, it also loses product, leading to the curve for the second reactor. The addition of both curves ("overall") shows the fraction of product remaining in the total system (i.e., the first and second reactors together) over time.

This explains that some of the product charged to the system has almost no residence time to be oxidized, while another fraction of the product can stay in the system for a very long time. Both incomplete oxidation and over-oxidation could have a detrimental effect on the final product.

This also explains why some fraction of the product will never be oxidized completely, because it did not have sufficient residence time in the reactor. As a consequence, a finishing step will always be required to fully complete the reaction to 100% oxidation.

As shown in FIG. 1, a series of CSTRs is utilized for the continuous oxidation of $CaS_x$ to calcium thiosulfate. The CSTRs used in the invention are operating at particular pressures and temperatures, using oxygen or air. Oxygen is preferred. In an alternative embodiment, in place of oxygen, sulfur dioxide may be used as the oxidizing agent at atmospheric pressure.

The CSTR reactors of the invention have feed injection points located at certain points which minimize feed material bypassing through the system without being reacted. This maximizes the contact between the oxygen and the liquid in the reactor, subsequently increasing the residence time in the reactor, using high efficiency mixers which maximize gas-liquid dispersion as well as solid suspension. In a preferred embodiment of the invention, the CSTR has a rotating agitator or stirrer, comprising a central rotatable shaft having two or more agitation blades or impellers disposed vertically with respect to one another on the shaft. In a still yet more preferred embodiment, the agitator or stirrer has three or more blades disposed vertically with respect to one another on the shaft, and the feed injection point for the oxygen is located adjacent to the middle blade.

Figure 5:
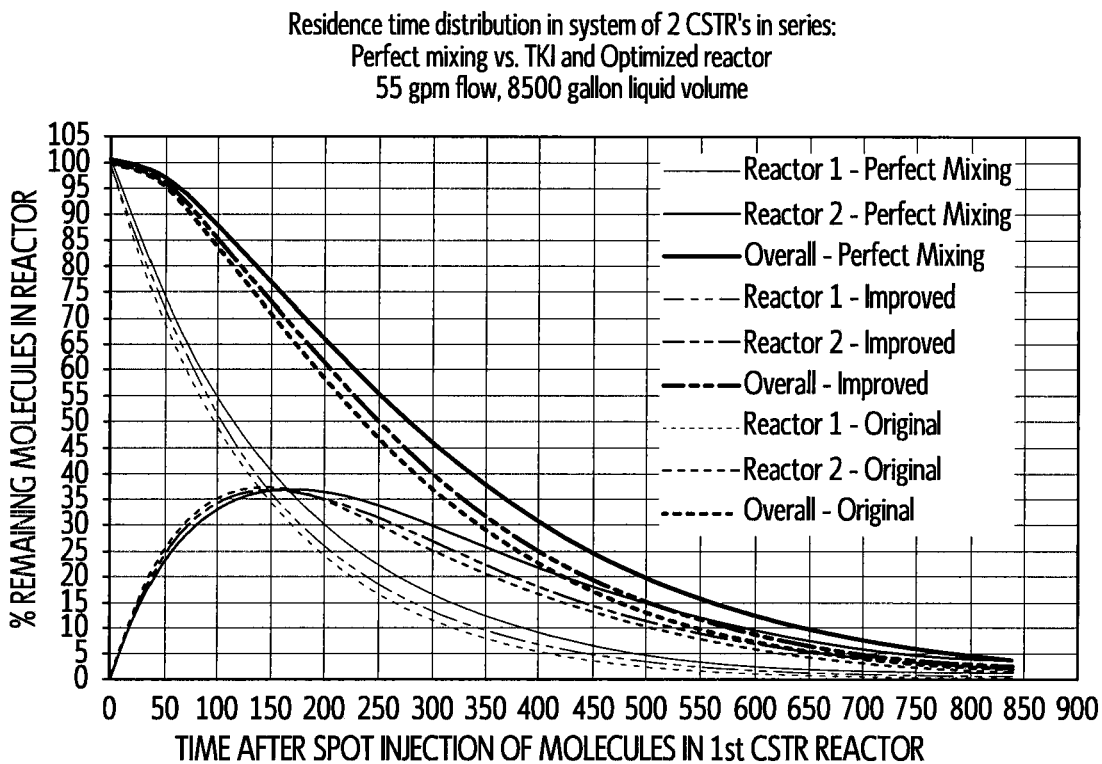
FIG. 5 is a graphical representation of the residence time distribution in a system of two CSTRs in series, showing the impact of improved mixing efficiency by a preferred orientation and position of the liquid feed injection point.

A continuous process will typically require a finishing step to complete the oxidation reaction to 100%, due to the residence time distribution in the system. FIG. 5 shows the residence time distribution in a system of two CSTRs in series—perfect mixing vs. original reactor design and vs. improved reactor design at 55 gpm flow and for a 8500 gal reactor volume. "Original" refers to a reactor with a liquid injection point at the top of the reactor according to an embodiment of the invention. "Improved" refers to a preferred embodiment of the invention, wherein the reactor has an agitator with three agitation (impeller) blades vertically spaced apart from one another, and wherein the liquid injection point is located adjacent the middle agitation blades. The preferred embodiment has a greater residence time in the reactor, and is closer to the theoretical residence time than the embodiment referred to as "Original". The term "perfect mixing" refers to the theoretical residence time.

Figure 6:
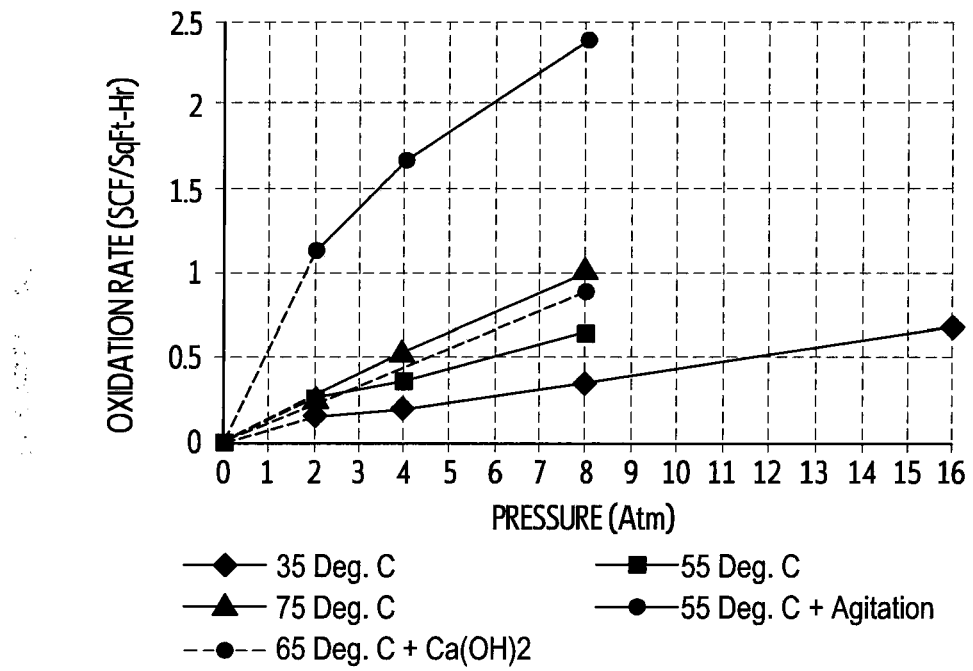
FIG. 6 is a graphical representation illustrating the effect of temperature, pressure and agitation on the oxidation reaction rate of calcium thiosulfate.

Calcium Thiosulfate Oxidation: Increased Reaction Efficiency at Higher Operating Pressures An important factor in the oxidation of the calcium polysulfide intermediate to a high concentration calcium thiosulfate product is the pressure of the oxidation reaction. The effect of pressure on the concentration of the product is shown in FIG. 6.

Operating pressure can be increased to maximize the contact between the oxygen and the $CaS_x$/calcium thiosulfate solution. In a lab scale equipment set up of a process and system according to the invention, increasing the pressure from 15-20 psig to 80 psig decreased the overall oxidation time by 70 to 75%. Subsequently, this allows the oxidation to take place at lower temperatures while maintaining reaction efficiencies. This improvement is valid for batch reactor processes as well as for continuous processes. The results from different lab tests are shown in Table 1.

It is to be noted that the incremental improvement of efficiency decreases with increasing pressure. A trade-off has to be made between operating pressure and higher reaction efficiency on one hand and equipment cost on the other hand.

TABLE 1

Improved Reaction Times at Higher Operating Pressures

| Agitator rpm | Reaction temp. °C. | $O_2$-Pressure Psig | Reaction time to full oxidation minutes |
|---|---|---|---|
| 750 | 70 | 20 | 243 |
|  |  | 45 | 117 |
|  |  | 60 | 84 |
|  |  | 80 | 64 |
|  |  | 80 | 60 |

Calcium Thiosulfate Oxidation: Simulation of Oxidation in CSTRs

Combining the residence time distribution in FIG. 4 with the batch oxidation rate in FIG. 3, one can predict the oxidation performance of the configuration of two CSTRs in series. Therefore, the fraction of product leaving the CSTRs after a certain residence time (derived from FIG. 4) has to be multiplied with the level of oxidation (0-100%) of the product at this specific residence time (derived from FIG. 3). The accumulation of the result will indicate the expected oxidation level at the output of the second CSTR, depending on the normal batch reaction time. The result is shown in Table 2.

The more efficient the reactor can be made, taking into account the preferred conditions disclosed herein (mixing, temperature and pressure), the higher the oxidation level of the product will be at the discharge of the second CSTR:

TABLE 2

Expected oxidation levels at discharge of second CSTR, as a function of reactor efficiency (measured as batch reaction time in a similar reactor design)

| Reactor efficiency as batch oxidation time [min] | % oxidized after 2 CSTRs at 55 gpm |
|---|---|
| 120 | 93.6 |
| 150 | 91.2 |
| 200 | 86.7 |
| 250 | 82.3 |

With a very efficient reactor design (normal oxidation time in a similar batch reaction of 120 min.), an oxidation level of 93% is expected at the outlet of a series of two CSTRs. In a less efficient design (normal oxidation time in a similar batch reaction of 250 min.), the expected oxidation level at the output of the second CSTR will only be 82%.

Calcium Thiosulfate Oxidation: Optimal Reaction Temperature and Polythionates

Figure 7:
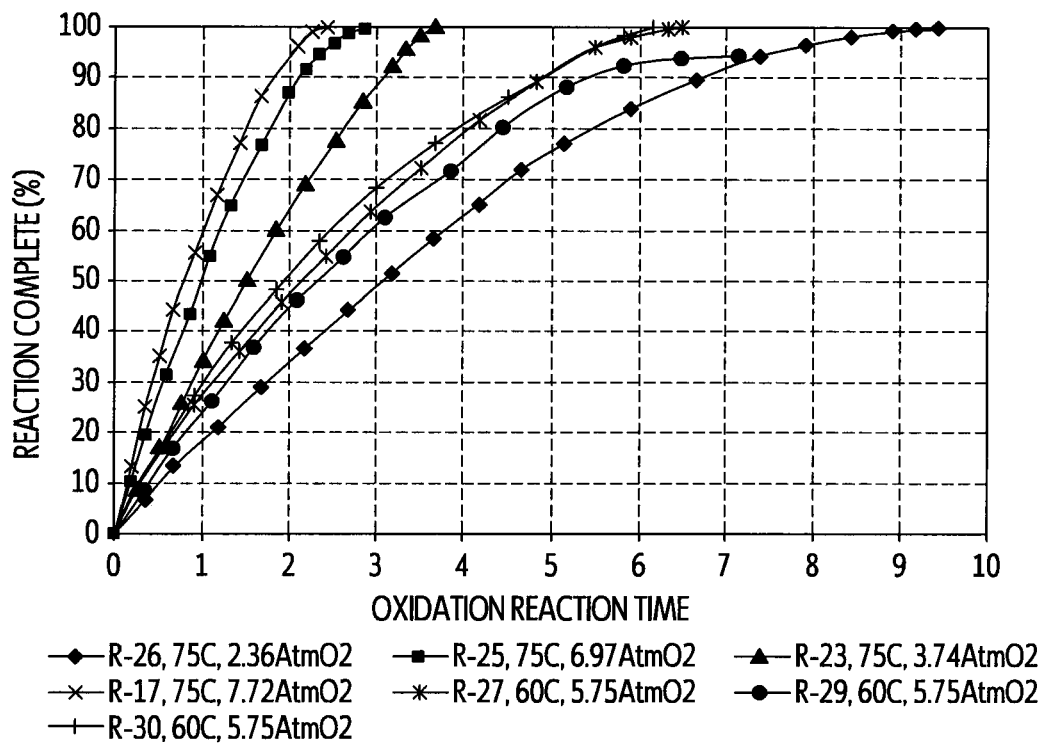
FIG. 7 is a graphical representation of the oxidation reaction efficiency as a function of temperature and pressure.

In a lab scale batch reactor, different oxidation tests were done at different oxidation temperatures. Higher oxidation temperatures showed faster reaction times (increasing the operating temperature from 70° C. to 90° C. decreased reaction times in the lab equipment to less than 30% of the initial reaction time). The effect of temperature on the reaction time is shown in FIG. 7.

However, the increased oxidation rates also caused increased levels of polythionates in the final product. This is due to an increased oxidation of the thiosulfate molecule.

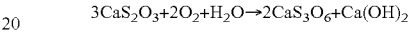

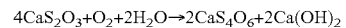

In the different tests, it was confirmed that polythionate levels increased with increased oxidation. This explains why higher levels of polythionates were seen when oxidizing over extended times or at elevated temperatures.

Figure 8:
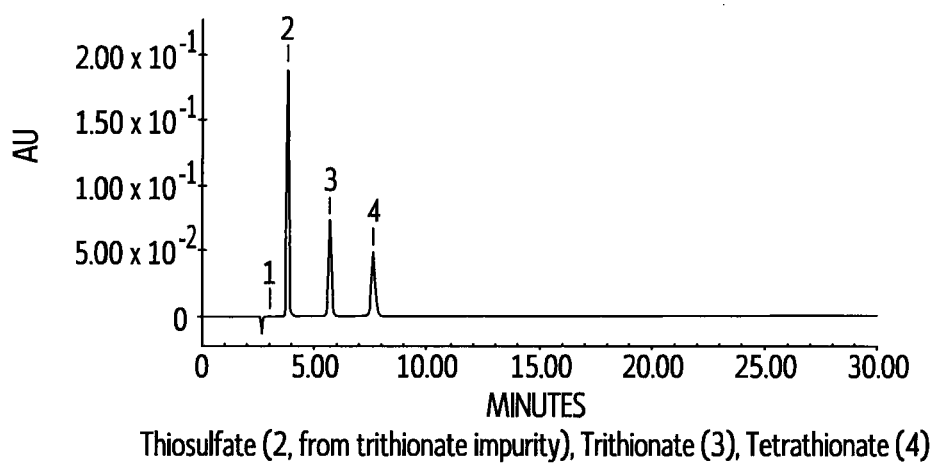
FIG. 8 is an HPLC chromatogram for thiosulfate, trithionate and tetrathionate.

Polythionates were monitored using HPLC. FIG. 8 shows a typical HPLC chromatogram for thiosulfate (2), trithionate (3), and tetrathionate (4). The trithionate was produced by oxidizing thiosulfate. However, not all the thiosulfate was oxidized, and as a result the trithionate contained some impurity from the starting thiosulfate (the impurity is peak 2 in the chromatogram).

For the specific application of gold leaching using calcium thiosulfate, high polythionate levels in the calcium thiosulfate should be avoided. This is because polythionates are strongly loaded on the resin used in the gold leaching process. Therefore, they reduce the gold and copper loading of the resin, as discussed in U.S. Pat. No. 6,632,264 B2 and U.S. Pat. No. 6,344,068 B1. The present invention avoids and/or minimizes the production of polythionates, by maintaining the reaction temperature during the oxidation of CaSx at about 70° C. (160° F.). The reaction temperature can be increased to higher levels (up to about 90° C. or 195° F.) to speed up the reaction, but only if polythionate levels remain within acceptable limits.

In one embodiment of the invention, higher polythionate levels may be permissible at the outlet of the reactor, because polythionates are unstable and will decompose to thiosulfate and sulfite at elevated pH and elevated temperature (U.S. Pat. No. 6,632,264 B2):

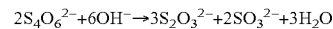

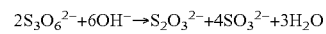

The mechanism of the decomposition reaction of tetrathionate is described in the following equations, in which tetrathionate first decomposes to thiosulfate and trithionate, and the latter further decomposes to thiosulfate and sulfite:

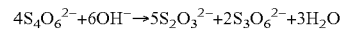

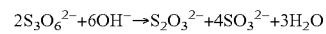

If pH, temperature, and residence time are sufficiently high, the polythionate levels will decrease due to the decomposition reactions above. This is a trade-off to be made during operation and/or design of the thiosulfate plant.

Destruction of Polythionates in Recovered Process Water

A major advantage of the calcium thiosulfate process according to the present invention is the complete destruction of polythionates in the $CaS_x$ process. This is specifically useful in leaching processes for precious metals, as there will be no build-up of polythionates, making it possible to recycle the process water from the leaching process for use in the thiosulfate production process according to the invention. Process water is the solution remaining after a thiosulfate solution is used to leach gold from gold ore and the gold-thiosulfate complex has been removed therefrom. A series of tests were performed to follow the polythionates contents of the calcium thiosulfate production.

In the first experiment, a sample of the aforementioned process water was used for the preparation of calcium thiosulfate. Lime, water (from process water), and sulfur were heated using appropriate mole ratios and temperature. The resulting calcium polysulfide was oxidized under appropriate temperature and pressure. HPLC analyses of this solution showed the presence of 2 mg/L of trithionate and 9 mg/L of tetrathionate.

Figure 9:
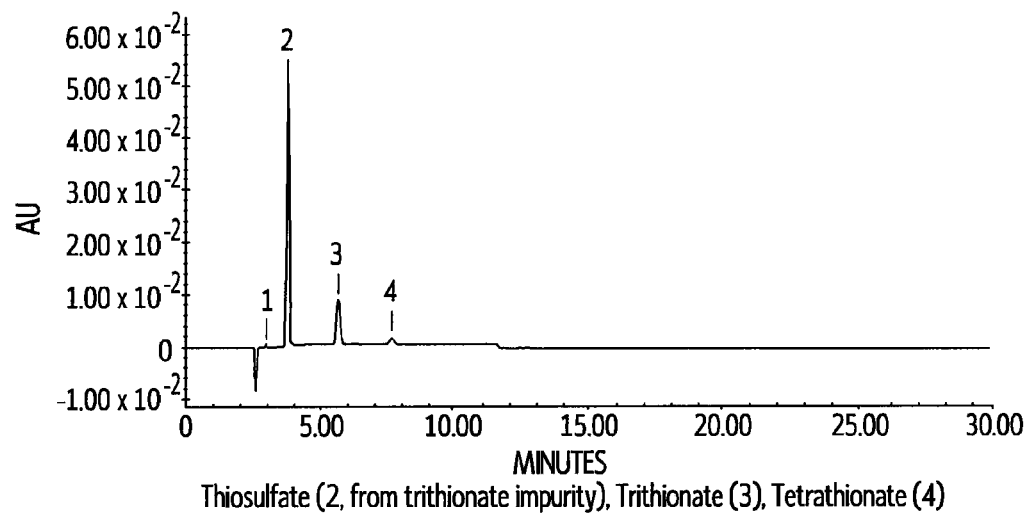
FIG. 9 is an HPLC chromatogram of the components of "process water" which may be used for preparation of calcium thiosulfate.
Figure 10:
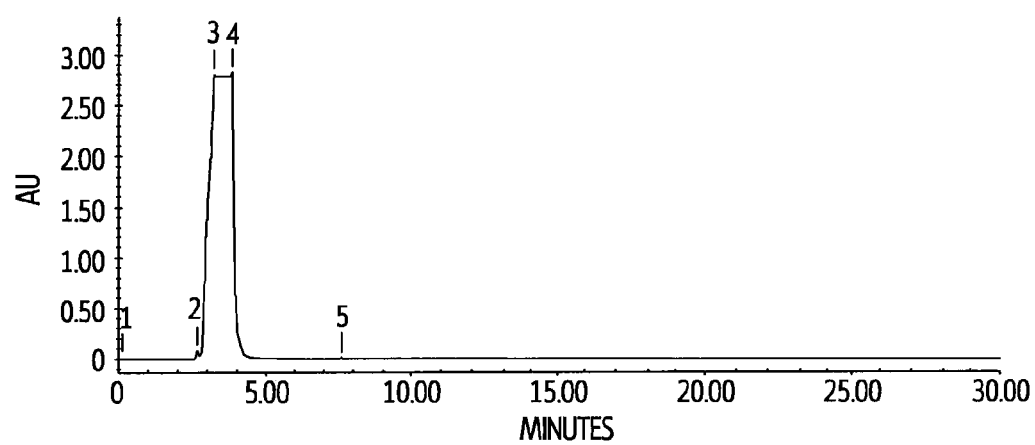
FIG. 10 is an HPLC chromatogram of calcium thiosulfate made with process water that has been spiked or fortified by addition of trithionate and tetrathionate.

In the second experiment, the process water solution was fortified with 3.63 g/L of trithionate and 0.62 g/L of tetrathionate. An HPLC chromatogram of this "process water" solution is shown in FIG. 9 (thiosulfate (2), trithionate (3), and tetrathionate (4)). This process water was used in the production of a calcium thiosulfate solution using the conditions described herein for calcium thiosulfate production. The analyses of this calcium thiosulfate solution by HPLC showed the same amounts of trithionate or tetrathionate compared to the previous experiment, which did not use the fortified process water, indicating the destruction of polythionates during the process. This proves that the final polythionate levels in calcium thiosulfate produced according to this invention are independent of the polythionate levels of the incoming feed streams. The lack of the polythionate peaks in FIG. 10 shows the destruction of polythionates.

Filtration of Calcium Thiosulfate Solution

Colloidal suspensions of calcium salts, such as sulfate, sulfite and suspended sulfur, generally are hard to filter. Flocculants and coagulants have been used in conjunction with filter aids for hard to filter slurries. There is no comprehensive quantitative theory for predicting the behavior of these materials which can be used for their selection. This must ultimately be determined experimentally. Different anionic and non-anionic flocculants were used for efficient filtration of the resulting substantially completely oxidized calcium thiosulfate solution. The calcium thiosulfate solution produced according to this invention has much lower amounts of the aforementioned calcium salts, but may still have some. Therefore, the calcium thiosulfate may be referred to as a slurry due to the presence of sulfate and sulfite salts and sulfur in the solution prior to application of the filter aid and filtering.

Filtration studies were carried out using diatomaceous earth for pre-coating that was mixed directly into the calcium thiosulfate slurry. The quantity of diatomaceous earth was 0.125% of the slurry. Since the application of flocculants was studied over a range of temperatures, the objective was to verify that the temperature of the slurry did not compromise flocculant performance. Flocculant dosage was varied at each temperature until flocculant appearance was consistent. Increasing the temperature up to 55° C. enhanced the filtration rate.

Dosage of flocculant was also investigated from under dosing to overdosing. Generally, the best performance was achieved when about 50-70 ug/gm of flocculant to slurry was used. Flocculant size did not seem to compromise filtration rate. Anionic flocculants performed much better that non-anionic ones.

TABLE 3

Effects of pH Adjustment on the Filtration of Calcium Thiosulfate

| pH of slurry | rate of filtration (gm/min) | | % filtrate (per total slurry weight) | | % solid cake (per total slurry weight) | |
|---|---|---|---|---|---|---|
| | Control | Floc. | Control | Floc. | Control | Floc. |
| 10.5 | 4.49 | 10.41 | 90.5 | 91.8 | 9.0 | 8.7 |
| 10.0 | 6.14 | 9.01 | 90.2 | 91.8 | 8.8 | 8.1 |
| 9.0 | 9.87 | 15.54 | 91.8 | 92.5 | 8.1 | 8.6 |
| 8.5 | 16.43 | 20.22 | 92.9 | 94.3 | 7.1 | 7.6 |
| 8.0 | 17.71 | 19.18 | 93.2 | 96.1 | 7.5 | 7.0 |
| 7.5 | 22.33 | 14.88 | 94.7 | 94.7 | 7.3 | 7.3 |
| 7.0 | 15.14 | 17.70 | 94.4 | 97.1 | 6.0 | 5.9 |
| 6.0 | 17.81 | 22.34 | 96.4 | 97.3 | 4.9 | 5.5 |

Figure 11:
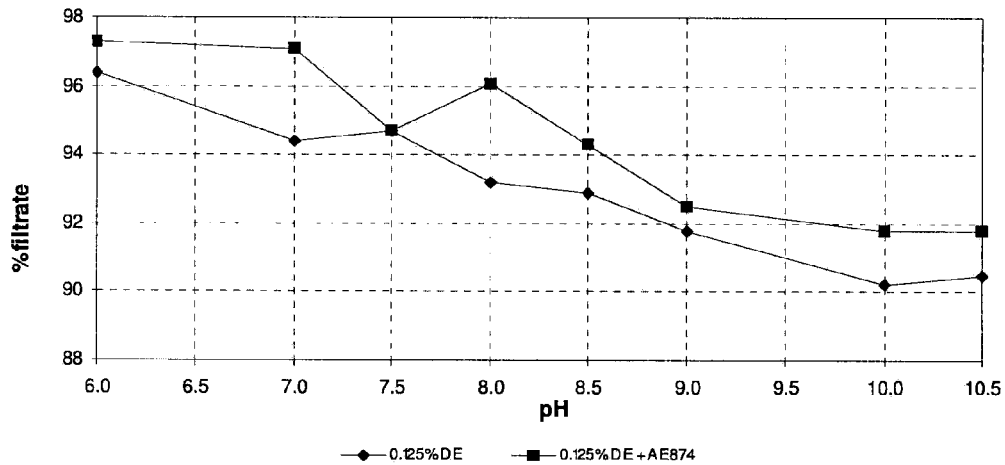
FIG. 11 is a graphical representation of the effect of pH on performance of flocculant in a calcium thiosulfate suspension produced according to the invention.

The effect of pH on the flocculant performance and ease of filtration of the slurry was also studied. It was observed that anionic flocculants lose their effectiveness at pH>11. Evaluation of calcium thiosulfate slurries treated with an anionic flocculant, AE874, and non-treated slurries were performed at pH values ranging from 6.0 to 10.5. Evaluation parameters included filtration rate, relative settling after consistent time and % solid cake and % filtrate in comparison to original slurry weight. Data is evaluated in Table 3 and FIG. 11.

Data indicates filtration rate is improved for both the untreated slurries and the slurries treated with flocculant as pH is reduced. However, the rate of filtration in flocculant-treated solutions still surpasses that of untreated mixtures. Optimum pH is indicated between 8-8.5. (For the slurry control at pH=10.5, rate=4.5 gm/min; the control at pH=8.5, rate=16.4 gm/min and flocculant treated slurry at pH=8.5, rate=20.2 gm/min.) Data also indicates that as pH is reduced, the quantity of filtrate increases and the quantity of filter cake solids decreases, relative to the amount of the slurry treated.

Acid Adjustment of Calcium Thiosulfate Product

Different acids were tested for pH adjustment including mineral acids, and acetic acid. Calcium thiosulfate has a very low buffer capacity and it requires a very small amount of acid to change its pH. Generally, strong mineral acids tend to decompose calcium thiosulfate, making it easy to overshoot the pH. Acetic acid is recommended, however a disadvantage is that a larger amount of acetic acid is required to adjust the pH as compared to the mineral acids.

Figure 12:
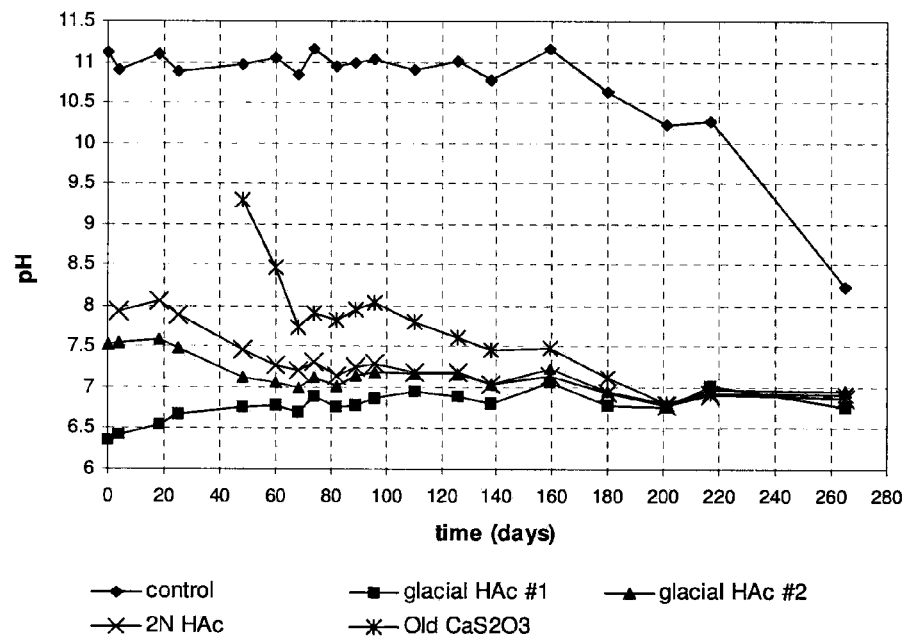
FIG. 12 is a graphical representation of the pH stability of calcium thiosulfate over time.

Calcium thiosulfate at neutral or close to neutral pH 7.5-8.5 is very stable and has a long shelf life. The pH of a sample of calcium thiosulfate was monitored its stability for several months. As is noted graphically in FIG. 12, the acid adjusted solutions are stable, while pH of the unadjusted control solution dropped. After 217 days of storage, the pH was 10.27. After 265 days of storage, the pH was 8.22, while the pH of an adjusted sample remained stable. Referring to FIG. 12, the "control" curve is calcium thiosulfate which was not acid adjusted, and the other curves show acid adjustment of calcium thiosulfate at different acid concentrations. The curve denoted "Old CaS2O3" in calcium thiosulfate solution that was pH adjusted with an amount of 2N acetic acid that was insufficient to bring the solution within the specified pH range upon treatment.

Determination of Physical and Chemical Properties

Figure 13:
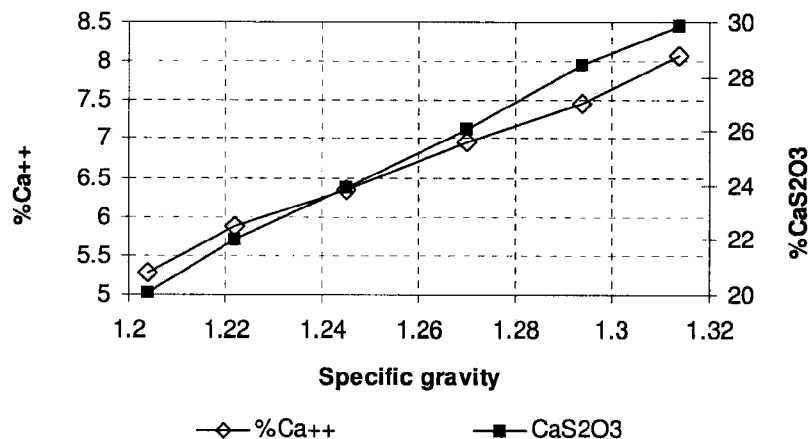
FIG. 13 is a graphical representation of the relationship between the specific gravity of a calcium thiosulfate solution and its $CaS_2O_3$ assay or its corresponding calcium content.
Figure 14:
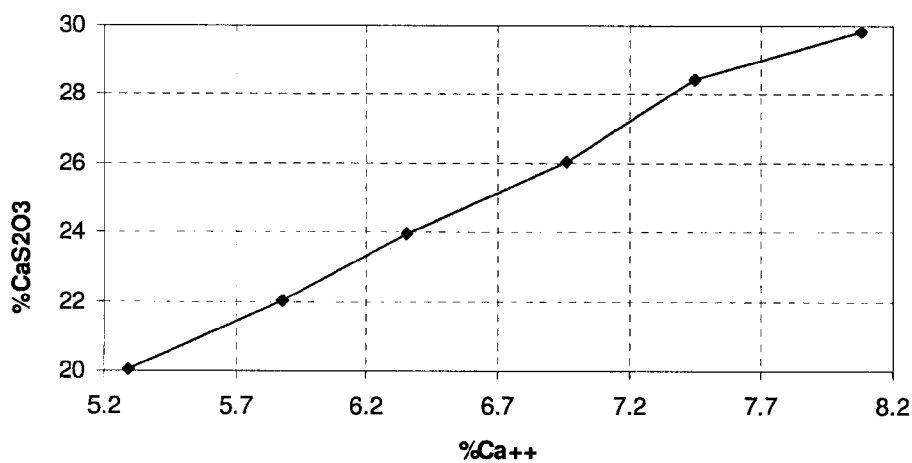
FIG. 14 is a graphical representation of the relationship between the assay of a calcium thiosulfate solution and the weight percent calcium in the calcium thiosulfate solution.

The following describes that the calcium thiosulfate produced according to the present invention has similar to identical physical and chemical properties to calcium thiosulfate produced by prior art processes. Characteristics of calcium thiosulfate were studied to develop a determination of concentration based on Specific Gravity. Also, a relationship between calcium thiosulfate concentration and % calcium in calcium thiosulfate was determined. The results are shown in FIG. 13 and FIG. 14.

Figure 15:
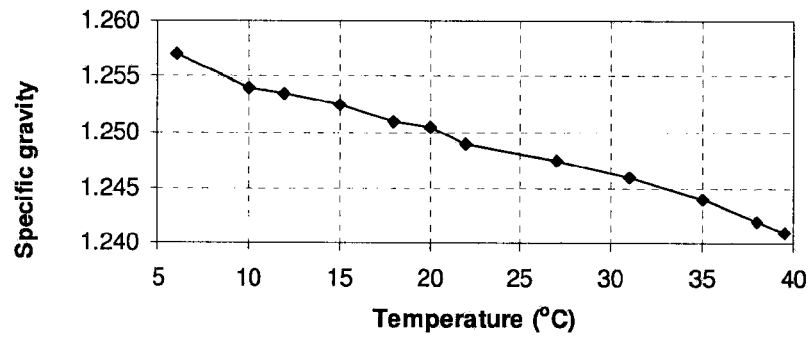
FIG. 15 is a graphical representation of specific gravity of calcium thiosulfate at varying temperatures.

Specific gravity of 24% calcium thiosulfate with varying temperature was investigated. The specific gravity of 24% (23.95%) calcium thiosulfate measured at temperatures ranging from 6.0° C. to 39.5° C. (42.8° F. to 103.1° F.) are shown in FIG. 15.

Long-term stability of calcium thiosulfate was addressed. The boiling point was determined in solutions from concentrations of 10% to saturation (34%). The boiling point temperature increased with increasing concentration of calcium thiosulfate. The boiling point temperature ranged from 97-103° C. Boiling point for 24% product was ~99.5° C. When calcium thiosulfate solutions of all concentrations were brought to boiling point temperatures, decomposition occurred. Stability studies were conducted at 40° C. for only one week. All concentrations of calcium thiosulfate retained stability over this period at 40° C. in closed bottles.

As is typical with solutions, freezing point depression was noted to increase as concentration of calcium thiosulfate increased. The freezing point ranges from 0° C. in 10% solution, to −8° C. in 34% solution. The freezing point for 24% calcium thiosulfate was ~−4° C. It does not salt out with reduced temperature, it freezes. All solutions remained stable after freezing and thawing with the exception of the saturated, 34% solution. It retained crystals upon thawing. $Ca^{++}$ concentration dropped by 1%. A 24% solution was frozen solid for approximately two weeks to provide data supporting the assertion that calcium thiosulfate retains stability despite freezing. Assay of the thawed product: pH=7.7, sg=1.250, % $Ca^{++}$=6.31, % calcium thiosulfate=23.65. The thawed solution contained small quantity of settled, fine, white solids. Calcium thiosulfate is exceedingly stable when stored in indoor conditions. Assay of a sample solution after many months did not change.

Examples

The following steps 1-5 are involved in an exemplary embodiment of the process of the invention:

Step 1: Lime Slaking 308 grams of water is placed in an agitated reactor fitted with a thermometer and 404 grams of commercial CaO is charged into the reactor. The exothermic mixture is agitated for 30-40 minutes for complete slaking Step 2: Calcium Polysulfide Preparation The above slaked lime [$Ca(OH)_2$] is heated to 194° F. and 443 grams of molten sulfur is added under agitation. The heating and agitating is continued for 3-4 hours until all the sulfur is dissolved.

Three experimental samples of calcium polysulfide were prepared as described above, each using a different amount of slaked lime [$Ca(OH)_2$]. Each sample was analyzed, and the results are shown in Table 4.

Step 3: Calcium Thiosulfate Preparation

The resulting lime-sulfur product (calcium polysulfide) from Step 2 is transferred to an agitated reactor capable of being pressurized to 4-8 atmospheres and equipped with inlet and outlet for air, a thermometer and a cooling system. Moderate agitation is applied to the mixture to provide an even interface of liquid-gas and with no vortex formation. All the air is purged out of the system by conducting three purges consisting of pressurizing the reactor to 10-15 psig, using oxygen, followed by depressurizing the system. The mixture is heated to 55-70° C. Oxidation is started by introducing oxygen to the system and maintaining the pressure of the system to 4-6 psig. Oxidation is continued until oxygen is no longer absorbed which is apparent by the lack of pressure drop or heat rise. About 211 grams of oxygen is consumed.

Step 4: Filtration

The resulting product from Step 3 is carefully adjusted to pH 7.5-8.5 in the filtering tank equipped with agitation and a pH electrode with glacial acetic acid. Filtration aid and 20-40 ppm of flocculant is added and the mixture is filtered. The resulting calcium thiosulfate product is a colorless, odorless liquid. A product with a concentration of near saturation of 30% can be prepared.

The following example illustrates an embodiment of the continuous process according to the invention, as demonstrated in a laboratory experiment simulating a CSTR in which calcium thiosulfate is produced continuously without fully oxidizing the product. A subsequent CSTR would be the finishing vessel, which would fully oxidize the product to calcium thiosulfate. In the experiment, 1 liter of $CaS_x$ slurry is synthesized. Half of the synthesized $CaS_x$ slurry is returned to the reactor and oxidation is commenced on this portion. Near the end of oxidation, 50 ml of the reactor contents are drawn and replaced with 50 ml of the retained $CaS_x$ slurry. Each collected sample—the intention is for the intermediate samples to be near completion, but not totally processed—is evaluated for $S_2O_3^=$ by IC and $S_3O_6^=$ by HPLC, visible color and pH. Data is shown in Table 5.

TABLE 5

Evaluation of Near-Complete Calcium Thiosulfate

| Sample # | Color | pH | Wt % Calcium thiosulfate | mg/L $S_3O_6^-$ |
|---|---|---|---|---|
| 1 | Yellow | 10.51 | 23.69 | 21 |
| 2 | Yellow | 10.28 | 23.52 | 173 |
| 3 | Light yellow | 9.80 | 24.01 | 115 |
| 4 | Colorless | 9.51 | 24.04 | 45 |
| 5 | Colorless | 9.35 | 24.05 | 7 |
| 6 | Yellow | 9.79 | 23.74 | 758 |
| 7 | Yellow | 10.11 | 24.77 | 3952 |
| 8 | Yellow | 9.92 | 23.73 | 1576 |
| 9 | colorless | 9.35 | 24.18 | 9 |

TABLE 4

Preparation of the Maximum Concentration of $CaS_x$ Solution

| Experiment # | $Ca(OH)_2$, g | S, g | Expected $C_{Ca}$, wt %* | $C_{Ca}$ in the lime-sulfur solution, wt % | Relative amount of solids, % | Recovery of Ca, % | $C_{CaS2O3}$, wt %** |
|---|---|---|---|---|---|---|---|
| 1 | 52.0 | 81.02 | 7.11 | 7.26 | 1.0 | 99.0 | 27.45 |
| 2 | 59.7 | 93.02 | 7.76 | 7.99 | 1.1 | 97.2 | 27.0 |
| 3 | 70.0 | 109.07 | 8.56 | 8.17 | 8.9 | 70.8 | *** |

* Calculation is based on 100% recovery of $Ca^{++}$ from lime in lime-sulfur solution
** Real $C_{CaS2O3}$ in the final calcium thiosulfate solution, produced from the corresponding lime-sulfur solution
*** Experiment #3 was not completed due to the low recovery of calcium in that step Note: Sample #9 is the finished product. The significance of the data is that it proves that $S_3O_6^=$ levels remain low, and more importantly, that polythionate levels do not increase during the continuous oxidation process, resulting in a final product with almost no $S_3O_6^=$ content. Moreover, the experiment proves that any additional $S_3O_6^=$ created in this process is destroyed. This procedure also confirmed that the calcium thiosulfate product remained stable throughout the process.

The following is an illustration of an exemplary embodiment of a large scale production process according to the invention, wherein only one CSTR was used, rather than the preferred embodiment's use of at least two CSTRs for oxidizing to produce calcium thiosulfate.

Step 1: Lime-Sulfur Reaction

The formulated amount of water is added through a nozzle in the top of the reactor and agitation started. The formulated amount of calcium oxide is added and is allowed about 30 minutes for slaking time. The temperature of the slurry mixture is increased by about 22° C. (40° F.). The slaked lime thus produced is transferred to the $CaS_x$ reactor. The slurry is heated to 90° C. and circulating pump is started.

The formulated amount of sulfur is added and the reaction temperature maintained at about 90° C. (194° F.). The reaction mixture is allowed to react at 90° C. for about 3 hours. At the end of the reaction, all the sulfur should be fully reacted and the calcium concentration in the lime-sulfur solution should be at a maximum. The lime-sulfur is a thin slurry at this point and will form a large mass of soft needle crystals if allowed to cool to room temperature.

Step 2: Oxidation Reaction

The lime-sulfur slurry produced in Step 1 is transferred to a calcium thiosulfate CSTR reactor and cooled to about 55-75° C.

The air in the vapor space of the CSTR is purged by pressurizing the reactor with oxygen to about 12 psig then venting down to atmospheric pressure. This is repeated for several purge cycles, in order to fill the vapor space with pure oxygen. Oxidation is started by setting the oxygen pressure in the reactor to about 5 psig and opening the liquid flow through the pump.

Cooling water flow is provided sufficiently to keep the reaction temperature from increasing above the set operating temperature. The oxidation reaction is continued until the oxygen flow to the reactor drops to zero. The reaction mixture does not consume more oxygen and no further heat is generated. At this point, all the polysulfide is converted to calcium thiosulfate and the mixture is very dark gray with a blue-green tint. Circulation is continued for about another 10-15 minutes to ensure all the polysulfide has oxidized, then the product is cooled down to less than about 50° C. and the agitator and the pump are turned off.

Step 3: Filtering

The product of Step 2 is then transferred to the Filter Feed Tank. The calculated amount of acetic acid is added to lower the pH of the mixture to pH 7.5-8.5. The required amount of flocculant is added and the filtration started.

What is claimed is:

1. A process for preparing calcium thiosulfate comprising the following steps:
   (a) partially oxidizing a calcium polysulfide solution in a first reactor to produce a calcium polysulfide/calcium thiosulfate solution;
   (b) transferring the solution produced in step (a) to a second reactor and further oxidizing the solution produced in step (a) to produce a calcium thiosulfate solution;
   (c) transferring at least a portion of the calcium thiosulfate solution produced in step (b) to a third reactor and substantially completely oxidizing the solution produced in step (b); and
   (d) recovering the substantially completely oxidized calcium thiosulfate solution produced in step (c).

2. The process of claim 1, wherein at least one of steps (a), (b) and (c) further comprises agitating the solution or solutions.

3. The process of claim 2, wherein at least one of step (a) and step (b) further comprises agitating the solution or solutions in a continuous stirred tank reactor.

4. The process of claim 3, wherein step (a) and/or step (b) further comprises introducing an oxidizing agent into the first reactor and/or second reactor at a point about equidistant from each solution's or solutions' surface level or levels in the reactor(s) and the bottom of the reactor(s).

5. The process of claim 3, wherein the first reactor and/or second reactor has an impeller with agitation blades immersed in the solution or solutions, and the impeller has a first agitation blade disposed at the solution or solutions' surface, a second agitation blade disposed at the bottom of the reactor or reactors, and a third agitation blade disposed between the first and second agitation blades, and
   step (a) and/or step (b) further comprises introducing an oxidizing agent into the first reactor and/or second reactor adjacent to the third agitation blade.

6. The process of claim 2, wherein the solution or solutions are agitated in one or more of the following: bubble columns, packed columns, tray columns, spray columns, mechanically agitated tanks, jet loops, pipes/tubes, agitators, in-line high shear and high impact mixing equipment, and cavitational reactors.

7. The process of claim 3, further comprising agitating at a rate in the range of about 100 to about 1200 rpm.

8. The process of claim 7, further comprising agitating at a rate in the range of about 600 to about 1000 rpm.

9. The process of claim 8, further comprising agitating at a rate in the range of about 600 to about 800 rpm.

10. The process of claim 1, wherein step (a) further comprises cooling the calcium polysulfide solution to about 55° C. to about 75° C. prior to oxidizing the solution.

11. The process of claim 1, wherein at least one of steps (a), (b) and (c) further comprises oxidizing at a temperature of about 70° C. to about 95° C.

12. The process of claim 11, wherein at least one of steps (a), (b) and (c) further comprises oxidizing at a temperature of about 70° C. to about 80° C.

13. The process of claim 12, wherein at least one of steps (a), (b) and (c) further comprises oxidizing at a temperature of about 70° C. to about 75° C.

14. The process of claim 1, wherein at least one of steps (a), (b) and (c) further comprises oxidizing at a pressure of about 15 psig to about 80 psig and the solution is oxidized with oxygen.

15. The process of claim 14, wherein at least one of steps (a), (b) and (c) further comprises oxidizing at a pressure of between about 40 psig to about 80 psig and the solution is oxidized with oxygen.

16. The process of claim 1, wherein step (c) further comprises agitating in a third reactor selected from the group consisting of cavitational reactors and semi-continuous reactors.

17. The process of claim 16, wherein step (c) further comprises oxidizing in a cavitational reactor at oxygen pressures up to about 3000 psig.

18. The process of claim 1, wherein step (d) further comprises adjusting pH of the calcium thiosulfate solution to a range of about 7.5 to about 8.5 pH.

19. The process of claim 18, wherein step (d) further comprises adjusting pH of the calcium thiosulfate solution to a range of about 8 to about 8.5 pH.

20. The process of claim 1, wherein step (d) further comprises filtering the oxidized calcium thiosulfate solution.

21. The process of claim 20, wherein step (d) further comprises adding a flocculant to the calcium thiosulfate solution prior to filtering.

22. The process of claim 21, wherein the flocculant is an anionic flocculant.

23. The process of claim 21 wherein the flocculant is added in an amount of about 50 to about 70 ug/gm of solution.

24. The process of claim 20, wherein step (d) further comprises increasing temperature of the oxidized calcium thiosulfate solution prior to filtering.

25. The process of claim 1, wherein step (a) further comprises preparing the calcium polysulfide solution by providing a calcium hydroxide slurry, adding sulfur to the slurry, and reacting the slurry.

26. The process of claim 25, wherein step (a) further comprises adding sulfur to the slurry at a sulfur to calcium hydroxide mole ratio of from about 1:1 to about 6:1.

27. The process of claim 26, wherein step (a) further comprises adding sulfur to the slurry at a sulfur to calcium hydroxide mole ratio of from about 3.4:1 to about 6:1.

28. The process of claim 27, wherein step (a) further comprises adding sulfur to the slurry at a sulfur to calcium hydroxide mole ratio of from about 3.4:1 to about 3.8:1.

29. The process of claim 28, wherein step (a) further comprises adding sulfur to the slurry at a sulfur to calcium hydroxide mole ratio of about 3.6:1.

30. The process of claim 29, wherein step (a) further comprises adding sulfur to the slurry at a sulfur to calcium hydroxide to water mole ratio of at least about 2:6:30.

31. The process of claim 30 wherein sulfur is added at a sulfur to calcium hydroxide to water mole ratio of about 3.6 to 4.9:1:25.5.

32. The process of claim 31, wherein step (a) further comprises adding sulfur to the slurry at a sulfur to calcium hydroxide to water mole ratio of about 3.6:1:25.5.

33. The process of claim 25, wherein step (a) further comprises reacting at a temperature of least about 70° C. to form the calcium polysulfide reaction mixture.

34. The process of claim 33, wherein step (a) further comprises reacting at a temperature of about 85° C. to about 99° C. to form the calcium polysulfide reaction mixture.

35. The process of claim 34, wherein step (a) further comprises reacting at a temperature of about 90° C. to about 92° C. to form the calcium polysulfide reaction mixture.

36. The process of claim 25, further comprising cooling the polysulfide reaction mixture to a temperature of about 55° C. to about 75° C.

37. The process of claim 1, wherein at least one of steps (a), (b) and (c) comprises oxidizing the solution or solutions using sulfur dioxide.

38. The process of claim 1, wherein step (d) further comprises adding a bacterial growth inhibitor to the substantially completely oxidized calcium thiosulfate.

39. The process of claim 38, wherein step (d) further comprises adding an alkali metal metabisulfite salt as a bacterial growth inhibitor to the substantially completely oxidized calcium thiosulfate.

40. A process for preparing calcium thiosulfate comprising the following steps:
(a) partially oxidizing a calcium polysulfide slurry in a first continuous stirred tank reactor at a temperature of about 70-95° C., at a pressure of about 15-80 psig, at an agitation rate of about 600-1200 rpm, to produce a calcium polysulfide/calcium thiosulfate solution;
(b) transferring the solution produced in step (a) to a second continuous stirred tank reactor and further oxidizing the solution produced in step (a) at a temperature of about 70-95° C., at a pressure of about 15-80 psig, at an agitation rate of about 600-1200 rpm, to produce a calcium thiosulfate solution;
(c) transferring at least a portion of the calcium thiosulfate solution produced in step (b) to a third reactor and substantially completely oxidizing the calcium thiosulfate solution produced in step (b) in the third reactor; and
(d) recovering the substantially completely oxidized calcium thiosulfate solution produced in step (c).

41. The process of claim 40, wherein:
step (a) comprises partially oxidizing a calcium polysulfide slurry at a temperature of about 70-75° C., at a pressure of about 40-80 psig, at an agitation rate of about 600-800 rpm, to produce the calcium polysulfide/calcium thiosulfate solution; and
step (b) comprises further oxidizing the solution produced in step (a) at a temperature of about 70-95° C., at a pressure of about 40-80 psig, at an agitation rate of about 600-800 rpm, to produce the calcium thiosulfate solution.

42. The process of claim 41, further comprising preparing a calcium polysulfide slurry in a continuous stirred tank reactor by providing a calcium hydroxide slurry, adding sulfur to the slurry at a sulfur to calcium hydroxide to water mole ratio of at least about 2:6:30; and reacting the slurry at about 90° C.-92° C. to form a calcium polysulfide solution, and transferring the calcium polysulfide solution to the first continuous stirred tank reactor of step (a).

43. The process of claim 42, further comprising a step of forming said calcium hydroxide slurry by combining calcium hydroxide and water.

44. The process of claim 43, further comprising a step of forming said calcium hydroxide slurry by combining calcium hydroxide and water, wherein the calcium hydroxide is about 96% to about 99% pure.

45. The process of claim 40, wherein step (c) further comprises substantially completely oxidizing the calcium thiosulfate solution in a third reactor is selected from the group consisting of a cavitational reactor and a series of semi-continuous finishing reactors.

46. The process of claim 40, further comprising determining oxidative endpoint of the calcium thiosulfate solution by monitoring one or more of the following:
Oxidation Reduction Potential change of the solution;
color change on lead acetate indicator paper of the solution;
color change of the solution from red to colorless;
presence of hydrogen sulfide in the solution; and
pressure changes in at least one of the reactors;
and stopping oxidation at about the oxidative endpoint to minimize over oxidation of calcium thio sulfate and formation of polythionates.

47. A continuous system for preparing calcium thiosulfate comprising:
(a) a first reactor for partially oxidizing a calcium polysulfide solution to form a calcium polysulfide/calcium thiosulfate solution;
(b) a second reactor for further oxidizing the solution produced in the first reactor to produce a calcium thiosulfate solution;
(c) a means for transferring the solution formed in the first reactor to the second reactor;

(d) a third reactor for substantially completely oxidizing the solution produced in the second reactor; and
(e) a means for transferring the solution formed in the second reactor to the third reactor,
wherein the first, second and third reactors are connected in line.

48. The system of claim 47, wherein the first and second reactors are continuous stirred reactors.

49. The system of claim 48 further comprising an additional reactor in line prior to the first reactor for preparing a calcium polysulfide solution.

50. The system of claim 48 further comprising an additional reactor for filtering the calcium thiosulfate solution produced in the third reactor.

51. The system of claim 47 wherein the fourth-reactor is a semi-continuous or cavitational reactor.

* * * * *